June 2, 1970        K. P. PALMER        3,515,002
TEMPERATURE SENSING APPARATUS
Filed Feb. 14, 1968
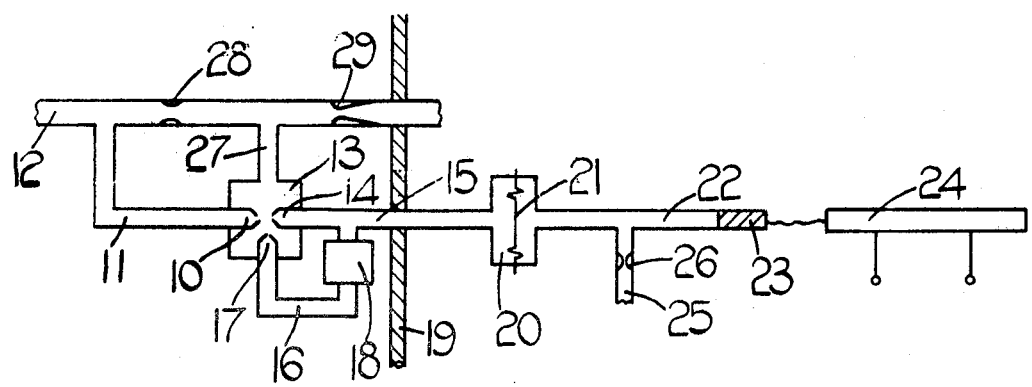
INVENTOR
KENNETH PERCIVAL PALMER
BY
ATTORNEYS 3,515,002
TEMPERATURE SENSING APPARATUS
Kenneth Percival Palmer, Barford, near Warwick, England, assignor to Joseph Lucas (Industries) Limited, Birmingham, England
Filed Feb. 14, 1968, Ser. No. 705,447
Int. Cl. G01k 11/00
U.S. Cl. 73—357        3 Claims

ABSTRACT OF THE DISCLOSURE

A temperature sensing apparatus for fluids where a first nozzle is connected to a source of the fluid the temperature of which is to be sensed and an aligned receiving nozzle communicates through time delay means with a further nozzle arranged to interfere with flow between the first and receiving nozzles at intervals, the frequency of the pulses on the receiving nozzle being related to the temperature of the fluid whereby an electrical signal is provided which varies with the pulse frequency.

---

This invention relates to apparatus for sensing the temperature of a fluid and has particular though not exclusive utility in sensing the temperature of the exhaust gases of a gas turbine engine.

The object of the invention is to provide temperature sensing apparatus in a convenient form.

In accordance with the present invention, temperature sensing apparatus comprises a first nozzle arranged to be supplied with fluid, the temperature of which is required to be gauged, a receiving nozzle aligned with the first nozzle to receive fluid emitted thereby, said receiving nozzle being disposed at an end of a passage which communicates with a further passage terminating in a nozzle arranged adjacent to the first and the receiving nozzles so that flow therethrough interferes with the flow of fluid between the first and receiving nozzles the further passage being such that a delay occurs between the flow through the first and receiving nozzles and the interference and the frequency of the pulses received in the receiving nozzle are related to the temperature of the fluid and the passage with which the receiving nozzle communicates also communicates with means for providing an electrical signal, which varies with the pulse frequency and therefore the temperature of the fluid.

A specific example of the invention will now be described with reference to the accompanying drawing, the single figure of which illustrates diagrammatically apparatus constructed in accordance with the invention.

The apparatus is intended for use with a gas turbine engine fuel system and is provided for sensing the temperature of the gases flowing through the jet pipe thereof, the temperatures involved in a typical engine ranging between 270° C. and 1600° C.

The apparatus comprises an inlet nozzle 10 communicating through a passage 11 with an inlet 12 from the jet pipe, the nozzle 10 being arranged to discharge across a chamber indicated diagrammatically at 13 to a receiving nozzle 14. The latter is disposed at one end of a passage 15 which in turn communicates with a further passage 16, terminating in a nozzle 17 which is arranged so that flow therefrom interrupts the flow between the first nozzle 10 and the receiving nozzle 14 at intervals.

The passage 16 incorporates means 18 for producing a predetermined time delay between the interruptions of the flow between the first and receiving nozzles 10, 14. The nature of the means 18 is such that the time delay is related to the temperature of the gas flowing through it from the passage 15. This is at the temperature of the gas in the engine jet pipe. The means 18 is, for example, an elongated passage causing resistance to the flow of fluid therethrough. With such a device, changes in density of the air will vary the time delay. Such a means is well known.

The passage 15 also communicates through a heat shield 19 with a chamber 20 containing a diaphragm 21, the chamber 20 at the opposite side of the diaphragm 21 communicating through a passage 22 with a pressure sensitive device 23. Connected to the pressure sensitive device 23 is suitable electronic equipment 24 whereby an electrical signal can be supplied for example to the fuel system for the gas turbine engine, in response to changes in the frequency of the pulses received at the diaphragm 21.

There is an expansion passage 25 which incorporates a restrictor 26 which severely restricts flow. This passage may however be omitted.

As the diaphragm 21 moves in response to pressure changes in the passage 15, fluid at the opposite side of the diaphragm 21 is pressurized to cause the device 23 to produce signals.

The chamber 13 communicates through a passage 27 with the inlet passage 12 from the jet pipe at the downstream side of a first restrictor 28. At a position downstream of the connection with the passage 27 is, moreover, a further restrictor 29, and the end of the passage 12 communicates with an outlet for the gases.

The restrictor 29 is preferably in the form of a venturi, and is so designed that throughout the pressure range in which the apparatus is intended to operate, flow through this restrictor occurs at substantially sonic speed. The pressure range in the particular example is 25 to 450 pounds per square inch.

Since the restrictor 29 is as described, arranged to permit flow therethrough at sonic speeds, there is a substantially constant pressure drop at the nozzle 14 throughout the pressure range. This arrangement ensures that the effect of pressure upon the circuit including the receiving nozzle 14, the passage 16, the device 18 and the nozzle 17 remain substantially unaffected by changes in pressure in the gas, the temperature of which is to be sensed.

It is to be understood that the pressure sensitive device 23 and the associated electrical or electronic equipment can take any convenient form, and furthermore that the apparatus is capable of supplying an electrical signal to any associated apparatus.

Having thus described my invention what I claim as new and desire to secure by Letters Patent is:

1. Apparatus for sensing temperature of a fluid comprising a chamber, a first nozzle arranged in said chamber and supplied with fluid, the temperature of which fluid is required to be gauged, a receiving nozzle in said chamber and aligned with the first nozzle to receive fluid emitted from said first nozzle, said receiving nozzle being disposed at the end of a conduit having a passage which communicates with a second conduit having a passage terminating in a third nozzle arranged in said chamber adjacent to the first and the receiving nozzles so that flow therethrough interferes with the flow of fluid between the first and receiving nozzles, said second passage being such that a predetermined time delay occurs between the flow through the first and receiving nozzles and the interference and the frequency of the pulses received in the receiving nozzle are related to the temperature of the fluid, a pressure responsive means connected between said first mentioned passage and said second passage, a third conduit connected at one end of said pressure responsive means and means for providing an electrical signal connected at the opposite end of said third conduit, said electrical signal varying with the pulse frequency and therefore the temperature of the fluid.

2. Apparatus as claimed in claim 1 in which said pressure responsive means comprises a flexible diaphragm disposed in a chamber which communicates with the passage with which the receiving nozzle communicates, the chamber at the other side of the diaphragm communicating with a pressure sensitive device with said electrical means whereby changes in pressure produce changes in an electrical signal, the frequency of the pulses in the receiving nozzle determining the pressure on the diaphragm.

3. Apparatus as claimed in claim 1 in which the first, receiving and third nozzles are disposed in a chamber to which fluid is supplied at substantially the same pressure as that supplied to the first nozzle.

References Cited

UNITED STATES PATENTS

| | | | |
|---|---|---|---|
| 2,526,635 | 10/1950 | Cochran | 73—196 |
| 3,289,134 | 11/1966 | Lamins et al. | |
| 3,302,398 | 2/1967 | Taplin et al. | 137—81.5 X |
| 3,314,294 | 4/1967 | Colston | 73—357 |

LOUIS R. PRINCE, Primary Examiner

D. M. YASICH, Assistant Examiner

U.S. Cl. X.R.

137—81.5